(12) United States Patent
Ocket

(10) Patent No.: US 10,663,560 B2
(45) Date of Patent: May 26, 2020

(54) MULTIPLE INPUT MULTIPLE OUTPUT RADAR SYSTEM

(71) Applicant: IMEC VZW, Leuven (BE)

(72) Inventor: Ilja Ocket, Kessel-lo (BE)

(73) Assignee: IMEC VZW, Leuven (BE)

( * ) Notice: Subject to any disclaimer, the term of this patent is extended or adjusted under 35 U.S.C. 154(b) by 414 days.

(21) Appl. No.: 15/498,390

(22) Filed: Apr. 26, 2017

(65) Prior Publication Data

US 2017/0315213 A1    Nov. 2, 2017

(30) Foreign Application Priority Data

Apr. 20, 2016    (EP) .................................... 16167677

(51) Int. Cl.
*G01S 7/34* (2006.01)
*G01S 13/87* (2006.01)
*G01S 7/40* (2006.01)
*G01S 7/03* (2006.01)

(52) U.S. Cl.
CPC ................ *G01S 7/34* (2013.01); *G01S 7/038* (2013.01); *G01S 7/4021* (2013.01); *G01S 13/878* (2013.01)

(58) Field of Classification Search
CPC .......... G01S 13/878; G01S 7/038; G01S 7/34; G01S 7/4021
USPC .......................................................... 342/91
See application file for complete search history.

(56) References Cited

U.S. PATENT DOCUMENTS

| | | | | |
|---|---|---|---|---|
| 2005/0176575 | A1* | 8/2005 | Chiu | C04B 35/04 501/134 |
| 2013/0214963 | A1* | 8/2013 | Vacanti | G01S 7/038 342/120 |
| 2014/0073266 | A9* | 3/2014 | Vosburgh | H04B 1/525 455/78 |
| 2014/0141712 | A1* | 5/2014 | Maunder | G01S 7/40 455/24 |

(Continued)

FOREIGN PATENT DOCUMENTS

DE    10 2015 118 077 A1    4/2016
EP        2 960 672 A1    12/2015

OTHER PUBLICATIONS

European Search Report, European Patent Application No. 16167677.0, dated Oct. 11, 2016, 10 pages.

(Continued)

*Primary Examiner* — Timothy A Brainard
(74) *Attorney, Agent, or Firm* — McDonnell Boehnen Hulbert & Berghoff LLP

(57) ABSTRACT

The present disclosure relates to a method for cancelling spillover in a MIMO radar system. The method comprises (i) transmitting and receiving a signal in a transmit-receive pair, the received signal including a spillover signal; (ii) routing a part of the transmitted signal of the transmit-receive pair to the received signal to increase the power level of the spillover signal; and (iii) cancelling the spillover signal and the part of the transmitted signal by a spillover cancellation subsystem associated with the transmit-receive pair. Because the part of the transmitted signal corresponds to the spillover signal, both of these signals may be added together to result in a combined signal having a high enough power level to improve the functioning of the spillover cancellation subsystem.

20 Claims, 1 Drawing Sheet

(56) References Cited

U.S. PATENT DOCUMENTS

2015/0118970 A1    4/2015  Thoukydides et al.

OTHER PUBLICATIONS

Guermandi, Davide et al., "A 79GHz Binary Phase-Modulated Continuous-Wave Radar Transceiver with TX-to-RX Spillover Cancellation in 28nm CMOS," ISSCC 2015 / Session 19 / Advanced Wireless Techniques / 19.7, 2015 IEEE International Solid-State Circuits Conference—(ISSCC) Digest of Technical Papers, Feb. 25, 2015, 3 pages.

Li, Zhaolong et al., "On the Leakage of FMCW Radar Front-End Receiver," Global Symposium on Millimeter Waves, GSMM 2008 Proceeding, Apr. 21, 2008, pp. 127-130.

Medra, Alaa et al., "An 80-GHz Low Noise Amplifier Resilient to the TX-Spillover in Phase-Modulated Continuous-Wave Radars," 2015 IEEE Radio Frequency Integrated Circuits Symposium, May 17, 2015, pp. 323-326.

Dinc, Tolga et al., "A 60 GHz Same-Channel Full-Duplex CMOS Transceiver and Link Based on Reconfigurable Polarization-Based Antenna Cancellation," 2015 IEEE Radio Frequency Integrated Circuits Symposium, 2015, pp. 31-34.

* cited by examiner

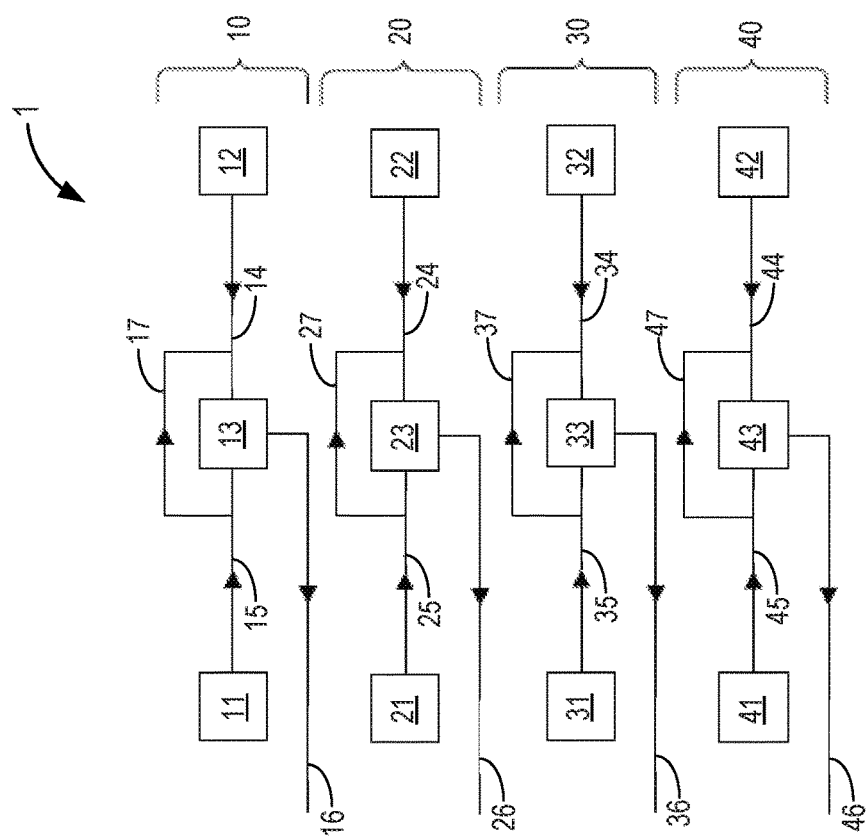

MULTIPLE INPUT MULTIPLE OUTPUT RADAR SYSTEM

CROSS-REFERENCE TO RELATED APPLICATION

The present application is a non-provisional patent application claiming priority to European Patent Application No. 16167677.0 filed Apr. 29, 2016, the contents of which are hereby incorporated by reference.

TECHNICAL FIELD

The present disclosure relates to improvements in a multiple input multiple output (MIMO) radar system, particularly to a method for cancelling spillover in a MIMO radar system.

BACKGROUND

A well-known issue in monostatic continuous wave radar systems is the spillover signal, i.e., the direct leakage of the transmitted signal from a transmitter into a receiver. This unwanted spillover signal is picked up by the receiver and can drown the desired received signal, which represents the surveyed scene. The spillover signal can be especially problematic in integrated systems, where antennas need to be closely spaced to allow miniaturization, thereby increasing the spillover signal power. Recently, an on-chip spillover cancellation circuit has been implemented in a 79 GHz radar system-on-chip (see Davide Guermandi et al., *A 79 GHz Binary Phase-Modulated Continuous-Wave Radar Transceiver with TX-to-RX Spillover Cancellation in 28 nm CMOS*, 2015 IEEE INT'L SOLID-STATE CIRCUITS CONF. (Feb. 25, 2015)). The spillover cancellation circuit is able to filter out, in the baseband domain, the unwanted spillover signal. However, in order to improve functioning of the spillover cancellation circuit, the spillover signal power may need to be within a certain range, i.e., the power may need to be above a certain threshold.

For a simple radar system comprising only one transmit-receive pair, the transmitter subsystem and the receiver subsystem can be placed in such a way that the spillover signal power is above the required threshold at all times by calculating the interference pattern of the spillover signal. For radar systems comprising multiple transmit-receive pairs, each pair being fed with the same phase signal, the subsystem placement becomes more complicated but still feasible. However, for a MIMO radar system, in which the transmit-receive pairs are independently excited with a different phase, the problem of placing the subsystems to guarantee the required spillover signal power becomes very complicated. The main issue is that it is very difficult to calculate the numerous different possible interference patterns when taking into account the independently generated transmitted signals. As such, it becomes very complicated or even impossible to determine a location of the subsystems which would result in receiving a spillover signal power level above the certain threshold for each receiver subsystem in each of the possible interference patterns.

SUMMARY OF THE DISCLOSURE

It is an object of the present disclosure to provide a method for cancelling spillover in a MIMO radar system comprising a plurality of transmit-receive pairs, each pair comprising a transmitter subsystem and a receiver subsystem and being associated with a spillover cancellation subsystem.

This can be achieved, according to an example embodiment, with a method comprising the steps of: (i) transmitting a signal from the transmitter subsystem of a transmit-receive pair; (ii) receiving a signal corresponding to the transmitted signal in the receiver subsystem of the transmit-receive pair, the received signal including a spillover signal with a power level; (iii) routing a part of the transmitted signal of the transmit-receive pair to the received signal to increase the power level of the spillover signal; and (iv) cancelling the spillover signal and the part of the transmitted signal by the spillover cancellation subsystem associated with the transmit-receive pair.

Because the part of the transmitted signal corresponds to the spillover signal, both these signals are added together and result in a total unwanted signal having a high enough power level to ensure the correct functioning of the spillover cancellation subsystem associated with the transmit-receive pair. The associated spillover cancellation subsystem then cancels both the spillover signal and the part of the transmitted signal leaving only the wanted received signal. Moreover, this method entirely avoids the problem of having to calculate the possible interference patterns in a MIMO radar system in order to determine the locations of the different receiver subsystems such that each receiver subsystem receives the necessary spillover signal power.

In an embodiment of the present disclosure, the method can further comprise the step of delaying the part of the transmitted signal to match a delay of the spillover signal.

This delay matching step removes possible small time differences between the spillover signal and the part of the transmitted signal, which in turn improves the functioning of the spillover cancellation subsystem by increasing the correlation between the received signal, including the part of the transmitted signal, and the transmitted signal, as the correlation value is used in the spillover cancellation subsystem to cancel the spillover signal.

In an example embodiment of the present disclosure, the step of routing a part of the transmitted signal of the transmit-receive pair to the received signal to increase the power level of the spillover signal can comprise routing the part of the transmitted signal directly from the transmitter subsystem of the transmit-receive pair to the received signal.

As such, there can be a direct connection provided between the transmitter subsystem and the received signal to route the part of the transmitted signal. As discussed below, this direct connection can also route the part of the transmitted signal to other subsystems where it can be added directly to the received signal. This direct routing can result in a lower loss of power during routing the part of the signal. Moreover, the routed part of the transmitted signal may not need to transition between different structures, thereby limiting the power loss of the part of the transmitted signal.

Some embodiments of the present disclosure include a circuit for cancelling spillover in a MIMO radar system.

This can be achieved, according to an example embodiment, with a circuit comprising: (i) a plurality of transmit-receive pairs, each pair comprising (a) a transmitter subsystem configured for transmitting a signal and (b) a receiver subsystem configured for receiving a signal corresponding to the transmitted signal, the received signal including a spillover signal with a power level; (ii) a plurality of connections, each connection being associated with a transmit-receive pair and being configured for routing a part of the transmitted signal of its associated transmit-receive pair to the received signal of its associated transmit-receive pair to increase the power level of the spillover signal; and (iii) a plurality of spillover cancellation subsystems, each associated with a transmit-receive pair and each being configured for cancelling the spillover signal and the part of the transmitted signal of its associated transmitter-receiver pair.

This circuit can perform some or all of the operations as the example method already discussed above.

In an example embodiment, the plurality of connections can each comprise a delay subsystem configured for delaying the part of the transmitted signal to match a delay of the spillover signal.

The delay subsystems can delay the part of the transmitted signal as in the method discussed above.

In an example embodiment, the plurality of connections can be direct connections configured for routing the part of the transmitted signal directly from the transmitter subsystem of a transmit-receive pair to the received signal of the transmit-receive pair.

These direct connections limit the loss of power as discussed above with respect to the example method. Moreover, these direct connections can result in a simple design and a less complicated circuit.

In an example embodiment of the present disclosure, each of the plurality of connections can be connected to at least one of: (i) a conduit between the receiver subsystem and the spillover cancellation subsystem of its associated transmit-receive pair; (ii) the receiver subsystem of its associated transmit-receive pair; or (iii) the spillover cancellation subsystem of its associated transmit-receive pair.

In such an embodiment, the part of the transmitted signal can be routed to multiple locations in the circuit, which can allow more design options when implementing the circuit.

Some embodiments of the present disclosure can provide a chip for cancelling spillover in a multiple input multiple output radar system.

This can be achieved, according to an example embodiment, with a chip including the example circuit as discussed above.

This chip can perform some or all of the operations as the example method and circuit already discussed above.

BRIEF DESCRIPTION OF THE DRAWINGS

FIG. 1 shows a circuit for cancelling spillover in a multiple input multiple output radar system, according to an example embodiment.

DETAILED DESCRIPTION

The present disclosure will be described with respect to particular embodiments and with reference to a certain drawing, but the disclosure is not limited thereto but only by the claims. The drawing described is only schematic and is non-limiting. In the drawing, the size of some of the elements may be exaggerated and not drawn to scale for illustrative purposes.

The present disclosure relates to improvements in a multiple input multiple output (MIMO) radar system, including a method for cancelling spillover in a MIMO radar system. The present disclosure further relates to a circuit for cancelling spillover in a MIMO radar system and an integrated circuit or chip, or some other arrangement, comprising the circuit.

As used herein, the term "MIMO radar system" refers to a radar system comprising a plurality of transmit-receive pairs, each pair comprising both (i) a transmitter subsystem configured for transmitting a signal and (ii) a receiver subsystem configured for receiving a signal corresponding to the transmitted signal, where the received signal can represent a reflection of the transmitted signal. The received signal can then be processed to determine the object and/or the environment where the MIMO radar system is placed. In a MIMO radar system, different transmitter subsystems can transmit signals independently from one another, and each receiver subsystem can receive signals from all transmitter subsystems.

As used herein, the term "spillover signal" refers to an unwanted signal resulting from the direct leakage of the transmitted signal from a transmitter subsystem to a receiver subsystem. The unwanted spillover signal can drown the desired received signal that represents the surveyed scene.

As used herein, the term "conduit" refers to a guide for transmitting a signal between two locations in a circuit. This guide may form a direct connection between the two locations, or it may form an indirect connection. In some examples, a conduit may comprise a dielectric material for guiding the signal.

FIG. 1 shows a circuit 1 for cancelling spillover in a MIMO radar system. The circuit 1 comprises four transmit-receive pairs 10, 20, 30, 40, each pair comprising (i) a transmitter subsystem 11, 21, 31, 41 configured for transmitting a signal and (ii) a receiver subsystem 12, 22, 32, 42 configured for receiving a signal corresponding to the transmitted signals. The received signal can represent a reflection of the transmitted signal, but the transmitted signals can also interfere with one another, and the received signal may include some interference. The circuit 1 further comprises four spillover cancellation subsystems 13, 23, 33, 43. Each spillover cancellation subsystem is associated with a transmit-receive pair 10, 20, 30, 40 and is configured for cancelling a spillover signal received by the receiver subsystem 12, 22, 32, 42.

Examples of spillover cancellation subsystems are already known (see Davide Guermandi et al., *A 79 GHz Binary Phase-Modulated Continuous-Wave Radar Transceiver with TX-to-RX Spillover Cancellation in 28 nm CMOS*, 2015 IEEE INT'L SOLID-STATE CIRCUITS CONF. (Feb. 25, 2015)) and will now be explained briefly with respect to a specific transmit-receive pair 10. It should also be understood that the spillover cancellation subsystems 23, 33, 43 of other transmit-receive pairs 20, 30, 40 may operate in a similar fashion.

The spillover cancellation subsystem 13 can take as an input a downconversion of the received signal from the receiver subsystem 12 via conduit 14. The received signal can represent a superposition of multiple copies of the transmitted signal with delays depending on the distance between the transmit-receive pair 10 and the surveyed scene. The received signal can also include the unwanted spillover signal. As a second input, the spillover cancellation subsystem 13 can take the undelayed transmitted signal via conduit 15. The spillover cancellation subsystem 13 can then correlate the received signal 14 with the undelayed transmitted signal 15. Since the spillover signal is also an undelayed signal containing a copy of the transmitted signal, the spillover signal contained in the received signal can have a non-zero correlation with the transmitted signal. The result of the correlation is a measure of how much of the transmitted signal is present in the received signal. A scaled copy of the original transmitted signal can then be subtracted from the received signal using the correlation value as a weight factor. As such, the spillover signal can be filtered from the received signal. The final signal, after the spillover signal has been cancelled, can be output from the spillover cancellation subsystem 13 via conduit 16.

In practice, the spillover signal can also be received in the receiver subsystem 12 with a certain delay caused by the finite distance between the receiver subsystem 12 and the transmitter subsystem 11. However, this delay can be much shorter than the delay from an actual reflection of the surveyed scene. The transmitted signal routed via conduit 15 to the spillover cancellation subsystem 13 can be delayed to improve the correlation between the spillover signal embedded in the received signal and the transmitted signal. A downside of the spillover cancellation subsystem 13 is that the power of the spillover signal may need to be above a predefined threshold to ensure the correct functioning of the spillover cancellation subsystem 13. In particular, the predefined threshold can be above −60 dB, such as approximately −50 dB.

To improve the spillover cancellation subsystem 13 operation, the circuit 1 can also include a coupling between the transmitter subsystem 11 and the signal received by the receiver subsystem 12. The coupling can occur by routing a part of the transmitted signal via conduit 17 directly to conduit 14 where it is added to the received signal. In some examples, the power level of the part of the transmitted signal can be between −40 dB and −50 dB, such as approximately −45 dB.

The signal entering the spillover cancellation subsystem 13 from the receiver subsystem 12 via conduit 14 can be a superposition of the actual wanted signal representing the surveyed scene, the spillover signal, and a part of the transmitted signal. This part of the transmitted signal can augment the spillover signal and prime the spillover cancellation subsystem 13. Priming the spillover cancellation subsystem 13 can be beneficial as it can improve functioning of the spillover cancellation subsystem 13 by causing the total spillover signal, i.e., the sum of the spillover signal and the part of the transmitted signal, to have a power that is above the predefined threshold. The spillover cancellation subsystem 13 can then cancel both the actual spillover signal and the part of the transmitted signal, leaving the wanted received signal intact.

As stated above, the actual spillover signal can be received in the receiver subsystem 12 with a certain delay. As such, the part of the transmitted signal routed via conduit 17 can also be delayed slightly to match the certain delay of the actual spillover signal. The delay used for the transmitted signal can be approximately the same as the delay of the spillover signal that occurs between the transmitter subsystem and the receiver subsystem in near field. This can be achieved by matching the "electrical length" of both paths. The physical path through the conduit 17 can be effectively shorter because the transmitted signal passes through a dielectric medium (relative permittivity of about 3.4), while the antenna-to-antenna path between the transmitter subsystem and the receiver subsystem is through air (relative permittivity equal to 1). This delay may be approximately 166 picoseconds (ps). Matching the delay of the part of the transmitted signal to the delay of the spillover signal can improve the correlation between both signals. However, it should be understood that matching the delay may not be implemented in examples where adequate compensation is provided in the spillover cancellation subsystem.

As stated above, the part of the transmitted signal can be directly coupled to the received signal via conduit 17. However, a direct coupling may not be necessary in some example embodiments. The part of the transmitted signal could also be routed indirectly to conduit 14, to the receiver subsystem 12, to the spillover cancellation subsystem 13, or to another subsystem between the receiver subsystem 12 and the spillover cancellation subsystem 13. Moreover, the part of the transmitted signal can also be split and sent to different subsystems. For example, half of the part of the transmitted signal can be routed to the receiver subsystem 12, and the other half of the part of the transmitted signal can be routed to conduit 14. In any case, the part of the transmitted signal can be added to the received signal before the received signal is processed in the spillover cancellation subsystem 13.

The explanation given above about the structure and operation of the transmit-receive pair 10 with its transmitter subsystem 11, its receiver subsystem 12, its spillover cancellation subsystem 13, and its associated conduits 14, 15, 16, 17 can also be applicable to the other transmit-receive pairs 20, 30, 40 with their transmitter subsystems 21, 31, 41, their receiver subsystems 22, 32, 42, their spillover cancellation subsystems 23, 33, 43, and their associated conduits 24, 25, 26, 27, 34, 35, 36, 37, 44, 45, 46, 47.

The circuit 1 discussed above can be implemented as one or more integrated circuit(s) or chip(s) mounted on a circuit board, e.g., an antenna board with the subsystems being arranged accordingly. It should be understood that various combinations of the subsystems on the integrated circuit(s) or chip(s) are possible.

The circuit 1 discussed above can also be integrated onto a chip, i.e., a system-on-chip, and can be used in a control system for controlling a MIMO radar system. For example, the chip can be used for cancelling the spillover signal in a MIMO radar system according to the following method.

A signal can be transmitted from the transmitter subsystem 11, 21, 31, 41 of a transmit-receive pair 10, 20, 30, 40. Different transmitter subsystems 11, 21, 31, 41 may also transmit signals concurrently. The transmitted signals can interfere with one another and with the objects in the surveyed scene and can be reflected and/or refracted by these objects. Next, a signal can be received by the receiver subsystems 12, 22, 32, 42. This received signal can include the actual wanted signal representing the surveyed scene and the unwanted spillover signal resulting from direct leakage from the transmitter subsystems 11, 21, 31, 41 to the receiver subsystems 12, 22, 32, 42. After having received the signal, the receiver subsystems 12, 22, 32, 42 can route the received signal to their associated spillover cancellation subsystems 13, 23, 33, 43. In some examples, the received signal can be routed directly via conduits 14, 24, 34, 44 or it could be routed indirectly via one or more subsystems between the receiver subsystems 12, 22, 32, 42 and the spillover cancellation subsystems 13, 23, 33, 43. Before the received signal is processed in the spillover cancellation subsystems 13, 23, 33, 43 a part of the transmitted signal can be added to the received signal to ensure that the sum of the spillover signal and the part of the transmitted signal has a power level above a predefined threshold. In the circuit 1 shown in FIG. 1, a part of the transmitted signal of a transmitter subsystem 11, 21, 31, 41 can be routed directly to conduit 14, 24, 34, 44 respectively via conduit 17, 27, 37, 47. This coupling between the transmitter subsystem and the receiver subsystem of a transmit-receive pair 10, 20, 30, 40 can also be done indirectly and can also occur in other subsystems as explained above. The spillover cancellation subsystem 13, 23, 33, 43 can then receive the received signal which can include the part of the transmitted signal, and the spillover cancellation subsystem 13, 23, 33, 43 can cancel both the spillover signal and the part of the transmitted signal as discussed above. After having cancelled the unwanted spillover signal, the signal can be output from the spillover cancellation subsystem 13, 23, 33, 43, such as via conduits 16, 26, 36, 46.

Although aspects of the present disclosure have been described with respect to specific embodiments, it should be understood that these aspects may be implemented in other forms.

What is claimed is:

1. A method for cancelling spillover in a multiple input multiple output (MIMO) radar system comprising a plurality of transmit-receive pairs, each pair comprising a transmitter subsystem and a receiver subsystem, and each pair being associated with a spillover cancellation subsystem, the method comprising the steps of:
    transmitting a signal from a respective transmitter subsystem of a respective transmit-receive pair of the plurality of transmit-receive pairs;
    receiving, by a respective receiver subsystem of the respective transmit-receive pair, a signal corresponding to the transmitted signal, the received signal including a spillover signal;
    routing a part of the transmitted signal from the respective transmitter subsystem of the respective transmit-receive pair to the received signal, thereby increasing a power level of the spillover signal; and
    cancelling, by a respective spillover cancellation subsystem associated with the respective transmit-receive pair, the spillover signal and the part of the transmitted signal.

2. The method of claim 1, wherein routing the part of the transmitted signal from the respective transmitter subsystem to the received signal comprises delaying the part of the transmitted signal to match a delay of the spillover signal.

3. The method of claim 2, wherein delaying the part of the transmitted signal to match the delay of the spillover signal comprises routing the part of the transmitted signal through a conduit having a relative permittivity greater than 1.

4. The method of claim 1, wherein routing the part of the transmitted signal from the respective transmitter subsystem to the received signal comprises routing the part of the transmitted signal directly from the respective transmitter subsystem of the transmit-receive pair to the received signal.

5. The method of claim 1, further comprising routing the received signal via a conduit from the respective receiver subsystem to the respective spillover cancellation subsystem.

6. The method of claim 5, wherein routing the part of the transmitted signal from the respective transmitter subsystem to the received signal comprises routing the part of the transmitted signal from the respective transmitter subsystem to the received signal via the conduit.

7. The method of claim 1, wherein the part of the transmitted signal routed from the respective transmitter subsystem to the received signal has a power level between −40 dB and −50 dB.

8. A circuit for cancelling spillover in a multiple input multiple output (MIMO) radar system, the circuit comprising:
    a plurality of transmit-receive pairs, each pair comprising a respective transmitter subsystem configured for transmitting a signal and a respective receiver subsystem configured for receiving a signal corresponding to the transmitted signal, the received signal including a spillover signal;
    a plurality of connections, each connection being associated with a respective transmit-receive pair of the plurality of transmit-receive pairs, and each connection being configured for routing a part of the transmitted signal of its associated transmit-receive pair to the received signal of its associated transmit-receive pair, thereby increasing a power level of the spillover signal; and
    a plurality of spillover cancellation subsystems, each spillover cancellation subsystem being associated with a respective transmit-receive pair of the plurality of transmit-receive pairs, and each spillover cancellation subsystem being configured for cancelling the spillover signal and the part of the transmitted signal of its associated transmitter-receiver pair.

9. The circuit of claim 8, wherein the plurality of connections each comprise a respective delay subsystem configured for delaying the part of the transmitted signal to match a delay of the spillover signal.

10. The circuit of claim 9, wherein each respective delay subsystem comprises a respective conduit having a relative permittivity greater than 1, such that routing the part of the transmitted signal through the respective conduit delays the part of the transmitted signal to match the delay of the spillover signal.

11. The circuit of claim 8, wherein each connection of the plurality of connections comprises a respective direct connection configured for routing the part of the transmitted signal of its associated transmit-receive pair directly from the respective transmitter subsystem of its associated transmit-receive pair to the received signal of its associated transmit-receive pair.

12. The circuit of claim 8, wherein each connection of the plurality of connections is connected to at least one of:
    a conduit between the respective receiver subsystem and the respective spillover cancellation subsystem of its associated transmit-receive pair;
    the respective receiver subsystem of its associated transmit-receive pair; or
    the respective spillover cancellation subsystem of its associated transmit-receive pair.

13. The circuit of claim 8, further comprising a plurality of conduits, each respective conduit of the plurality of conduits being connected between a respective receiver subsystem and a respective spillover cancellation subsystem, wherein the respective receiver subsystem is configured for routing its received signal to the respective spillover cancellation subsystem via the respective conduit.

14. The circuit of claim 13, wherein each connection of the plurality of connections is configured for routing the part of the transmitted signal of its associated transmit-receive pair to a respective conduit of the plurality of conduits.

15. The circuit of claim 8, wherein the part of the transmitted signal routed from the respective transmitter subsystem to the received signal has a power level between −40 dB and −50 dB.

16. An integrated circuit for cancelling spillover in a multiple input multiple output (MIMO)) radar system, the integrated circuit comprising:
    a plurality of transmit-receive pairs, each pair comprising a respective transmitter subsystem configured for transmitting a signal and a respective receiver subsystem configured for receiving a signal corresponding to the transmitted signal, the received signal including a spillover signal;
    a plurality of connections, each connection being associated with a respective transmit-receive pair of the plurality of transmit-receive pairs, and each connection being configured for routing a part of the transmitted signal of its associated transmit-receive pair to the received signal of its associated transmit-receive pair, thereby increasing a power level of the spillover signal; and a plurality of spillover cancellation subsystems, each spillover cancellation subsystem being associated with a respective transmit-receive pair of the plurality of transmit-receive pairs, and each spillover cancellation subsystem being configured for cancelling the spillover signal and the part of the transmitted signal of its associated transmitter-receiver pair.

17. The integrated circuit of claim 16, wherein the plurality of connections each comprise a respective delay subsystem configured for delaying the part of the transmitted signal to match a delay of the spillover signal.

18. The integrated circuit of claim 17, wherein each respective delay subsystem comprises a respective conduit having a relative permittivity greater than 1, such that routing the part of the transmitted signal through the respective conduit delays the part of the transmitted signal to match the delay of the spillover signal.

19. The integrated circuit of claim 16, further comprising a plurality of conduits, each respective conduit of the plurality of conduits being connected between a respective receiver subsystem and a respective spillover cancellation subsystem, wherein the respective receiver subsystem is configured for routing its received signal to the respective spillover cancellation subsystem via the respective conduit.

20. The integrated circuit of claim 19, wherein each connection of the plurality of connections is configured for routing the part of the transmitted signal of its associated transmit-receive pair to a respective conduit of the plurality of conduits.

* * * * *